Dec. 15, 1925.
N. I. IVANOVSKY
1,565,370
FURNACE
Filed Dec. 27, 1924    2 Sheets-Sheet 1
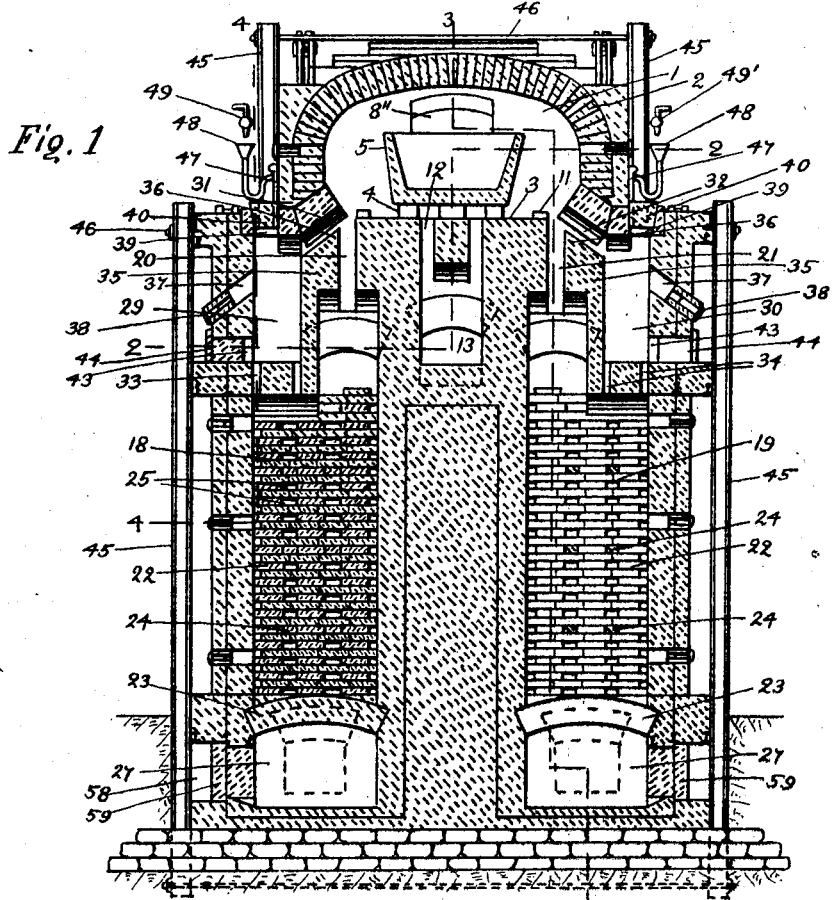
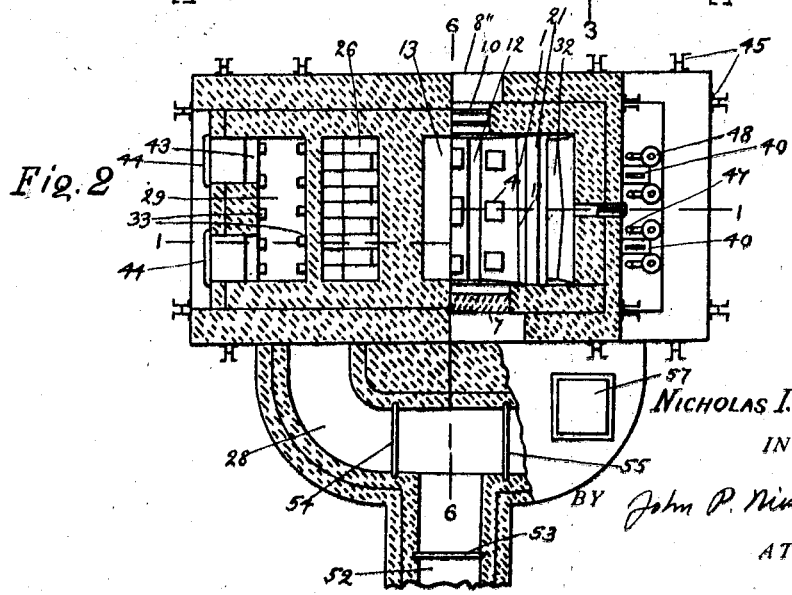
NICHOLAS I. IVANOVSKY
INVENTOR
BY John P. Mironow
ATTORNEY

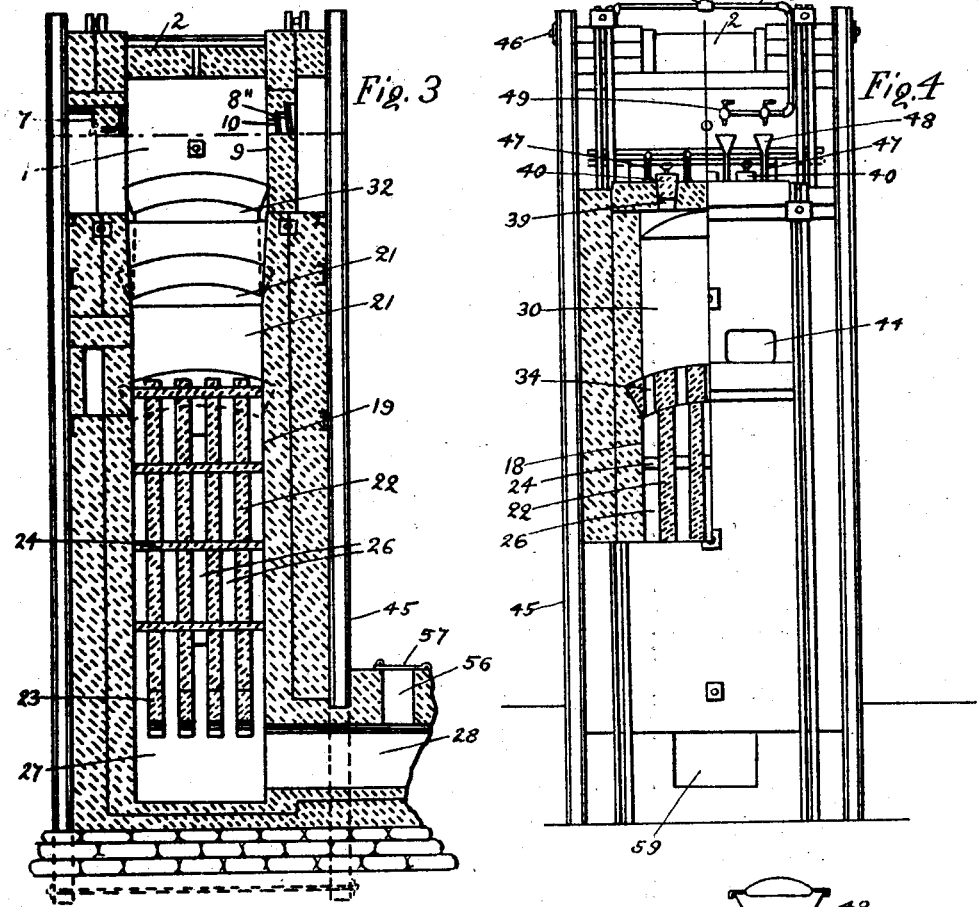

Patented Dec. 15, 1925.

1,565,370

UNITED STATES PATENT OFFICE.

NICHOLAS I. IVANOVSKY, OF NEW YORK, N. Y.

FURNACE.

Application filed December 27, 1924. Serial No. 758,399.

*To all whom it may concern:*

Be it known that I, NICHOLAS I. IVANOVSKY, citizen of Russia, and resident of New York city, in the county of New York and State of New York, have invented certain new and useful Improvements in Furnaces, of which the following is a specification.

My invention relates to furnaces and has a particular reference to furnaces of a regenerative type in which the air required for the combustion of fuel is preheated in passing through regenerative chambers. These regenerative chambers thereby return the heat previously absorbed from the hot exhaust gases. For this purpose the flow of gases through the furnace is reversed at regular intervals of time, admitting the air through regenerative chambers which were used during previous cycle for the exhaust of the hot burned gases.

My invention has a further reference to furnaces in which a liquid fuel is gasified before being admitted to the combustion chamber. The object of my invention is to provide a furnace in which fuel is gasified in special regenerative chambers built in connection with main regenerative chambers and adapted to be also heated by the hot exhaust gases from the furnace. The fuel is admitted into these fuel regenerative chambers alternately in accordance with the reversals of the flow of gases. The vaporized and gasified fuel from these chambers is then mixed with the preheated air and burned in the combustion chamber.

My invention is more fully described in the accompanying specification and drawings in which—

Fig. 1 is an elevation in section (taken on the line 1—1, Fig. 2), Fig. 2 is a plan in section (on the line 2—2, Fig. 1), showing also in section underground flues, Fig. 3 is a sectional view taken on the line 3—3, Fig. 1, Fig. 4 is a side view partly in section (taken on the line 4—4, Fig. 1), Fig. 5 is a detailed view of the fuel feeding apparatus, and Fig. 6 is a partial sectional view on the line 6—6, Fig. 2.

My furnace consists of a combustion chamber 1 covered on top and on the sides with a refractory material 2, such as firebrick, etc., and also lined with a refractory material 3 on the bottom. Blocks 4 are placed on the bottom, forming supports for a melting pot 5, containing glass, metal or any other material which it is intended to melt. A door 6 is provided at the side of the combustion chamber for insertion and removal of the pot. This door or port is closed during operation of the furnace with a block 7 provided with sight holes 8 closed with removable plugs 8'. An observation window 8" is provided in the opposite wall 9 with transparent plates 10 made of quartz or glass of a high melting point.

In order to provide an outlet for the molten material to escape without clogging or damaging the other parts of the furnace in case if the pot breaks, the floor around the pot is surrounded with a ridge or wall 11, and ducts 12 are provided to an escape chamber 13 underneath. The floor of this chamber is made with a central elevation 14 (Fig. 6) in order to facilitate the flow of the melted material towards side ports 15 and 16 which are usually closed with blocks 17.

Regenerative chambers 18 and 19 are placed on both sides of the combustion chamber with communicating passages 20 and 21. Narrow vertical walls 22 are built inside of the chambers of firebrick or similar refractory material, being supported on narrow arches 23 underneath. The walls 22 are stiffened with brick spacers 24 and are provided with numerous transverse openings 25. The passages 26 between the walls 22 are in a communication with underground chambers 27 and flues 28.

Gas producing chambers 29 and 30 are placed on both sides of the combustion chamber 1 and in a communication with it by means of gas ducts 31 and 32. The fuel or gas producing chambers are also in a communication with regenerative chambers by means of passages 33 and 34. The gas ducts 31 and 32 are placed at an angle with the passages 20 and 21 the separating wall 35 forming a sharp edge or "flame breaker" 36. I found that an angle of 50 to 55 degrees at this point gives the best practical results.

The flame may be observed through vents 37 with removable plugs 38. These vents may be also used for cleaning the sides of the duct or burner 31. The chambers 29 are provided with apertures 39 on top closed with plugs 40. Through these apertures the chambers may be cleaned, the dirt being dropped through vents 33 and passages 26, or removed through side ports 41, ordinarily closed with plugs 42.

The side walls of the regenerative chambers are provided with observation ports 43 closed with removable plugs 44.

The whole structure is braced with steel beams 45 braced together with tie rods 46.

The liquid fuel, such as crude oil etc., is fed into producer chambers 29 and 30 through feed pipes 47 (shown separately in Fig. 5) provided on top with funnels 48. These pipes are provided with U-shaped portions forming liquid traps so as to prevent the flow of air or gases through these pipes.

The fuel oil is admitted to the funnels 48 by drops from distributing cocks or valves 49 connected by means of pipes 50 with a fuel storage tank (not shown). The amount of fuel fed may be regulated by means of a central regulating valve 51.

The flues 28 are connected with a central flue 52 and with a chimney (not shown). The force of draft is regulated by means of a draft gate valve 53, consisting of a plate which may be raised or lowered according to the draft requirements. Similar gate valves 54 and 55 control the flow of the exhaust gases from the regenerative chambers. The air may be admitted into the flues through ports 56 with closure or valves 57.

The flues 28 and bottom chambers 27 may be cleaned through ports 58 closed with removable plugs 59.

The operation of my regenerative furnace is as follows: The plug 44 is at first removed and a fire is started in the gas producing chamber 29 by burning wood, coal, etc., until the temperature in the furnace is raised to about 350-450 degrees centigrade. The gate 54 is closed with a corresponding air valve 57 open so as to admit the air through chamber 18. The gate valve 55 is open with the corresponding air valve 57 closed, so that the hot products of combustion can flow into the chimney through the regenerative chamber 19, thereby heating the walls of the passages 26. A portion of these gases will also flow through the port 32, gas producing chamber 30 and ports 34 into the regenerative passages 26, thereby heating the walls of the gas producing chamber.

After a while, when the walls of the chambers 30 and 19 attain a proper temperature, the cycle of operations is reversed by closing the gate 55, opening the corresponding air valve 57, opening the gate 54 and closing the corresponding air valve 57, and by opening fuel valve 49'. The air will then flow through the port 56, flue 28 and between red hot bricks in the passages 26, finally emerging into the combustion chamber 1 through ports 21. A portion of the air, however, will deviate into the chamber 30, forming a gaseous mixture with products of decomposition of the fuel oil which drops from the pipe 47 on the red hot walls and bottom of the chamber 30. A portion of the oil and its products of decomposition will be ignited, raising the temperature in the gas producing chamber. The unburnt gases from this chamber will flow into the combustion chamber 1 through the burner or port 32, mixing with the heated air from the port 21 and forming a hot flame with the hottest point somewhere near the central portion of the combustion chamber 1, where it will be most efficient in heating the pot 5.

The hot gases from the combustion chamber will then flow through the regenerative chamber 18 and partly through the gas producing chamber 29, and through flues 28 and 52 into the chimney. The oil valve 49 is then closed.

After a while, when the chambers 29 and 18 become properly heated and the chambers 30 and 19 begin to cool off, the cycle of operation is again reversed.

The mechanism, controlling the opening and closing of the gates and valves, is not shown, and their operation may be manual or automatic, for instance, by being controlled from a clock mechanism.

It is evident that the construction of my furnace may be modified without deviating from the principle of my invention. For instance, the regenerative chambers may be placed side by side in relation to the combustion chamber, also the latter may be placed between the regenerative chambers instead of being above as shown; the furnace and the combustion chamber may be adapted for heating metal bars, pipes, etc., or a melting pot may be formed in the center of the combustion chamber, as, for instance, is used in glass manufacture.

Also instead of a liquid fuel a combustible powdered substance may be used with a suitable arrangement for introducing same into the gas producing chamber.

Important advantages of my regenerative furnace are that it may use cheap grades of liquid fuel, being very efficient and economical in its use; also that it does not require any special fuel feeding power operated mechanism, such as steam or compressed air injectors or vaporizers. Its operation is entirely noiseless, and the temperature regulation very simple and efficient.

I claim as my invention:

1. In a furnace, the combination with a combustion chamber, a regenerative chamber adjacent to said combustion chamber, a plurality of brick walls forming passages in said regenerative chamber, means to heat said walls by the exhaust gases from said combustion chamber, a gas producing chamber made of refractory material adjacent to said regenerative chamber and to said combustion chamber, the walls of said gas producing chamber being provided with apertures communicating with said regenerative chamber and with said combustion chamber, means to heat the walls of said gas producing chamber by means of the exhaust gases from said combustion chamber, means to admit fuel into said gas producing chamber, and means to admit air into said combustion chamber partly through said regenerative chamber and partly through said gas producing chamber.

2. In a furnace, the combination with a combustion chamber, a regenerative chamber adjacent to said combustion chamber, a plurality of walls forming passages in said regenerative chamber, means to heat said walls by the exhaust gases from said combustion chamber, a gas producing chamber adjacent to said regenerative chamber and to said combustion chamber, the walls of said gas producing chamber being provided with apertures communicating with said regenerative and said gas producing chambers, means to heat the walls of said gas producing chamber by the exhaust gases from said combustion chamber, means to admit liquid fuel by drops into said gas producing chamber, and means to admit air into said combustion chamber partly through passages directly from said regenerative chamber and partly through said gas producing chamber, the passages through said gas producing chamber being so proportioned as to cause a saturation of the air with gasified products from said liquid fuel.

3. In a furnace, the combination with a combustion chamber, a regenerative chamber adjacent to said combustion chamber, a gas producing chamber adjacent to said regenerative chamber and to said combustion chamber, means to admit fuel into said gas producing chamber, a second regenerative chamber, a second gas producing chamber, means to admit fuel into said second gas producing chamber, said gas producing chambers being adapted to receive a portion of the heated air from said regenerative chambers and to deliver a combustible mixture into said combustion chamber and in the path of the remaining portion of said heated air, and a reversible means to control the flow of air, gases and fuel through said chambers.

4. In a furnace, the combination with a combustion chamber, a regenerative chamber adjacent to said combustion chamber, a gas producing chamber adjacent to said combustion and to said regenerative chambers, means to admit air into said combustion chamber through said regenerative chamber, means to admit a portion of said air from said regenerative chamber into said gas producing chamber, means to admit fuel into said gas producing chamber, means to admit said gasified products from said gas producing chamber into said combustion chamber, a second regenerative chamber adjacent to the other side of said combustion chamber, a second gas producing chamber adjacent to said combustion chamber and to said second regenerating chamber, means to admit fuel into said second gas producing chamber, means to exhaust the burned gases through said second regenerative chamber and through said second gas producing chamber, means to render said second fuel admitting means inoperative, and means to reverse the flow of air, gases and fuel through said chambers.

5. In a furnace, the combination with a combustion chamber, a regenerative chamber adjacent to said combustion chamber, a plurality of walls in said regenerative chamber forming narrow passages, a gas producing chamber adjacent to said regenerative and to said combustion chambers, means to admit air into said combustion chamber through said regenerative chamber, means to admit a portion of the air from said regenerative chamber into said gas producing chamber, a plurality of pipes adapted to admit fuel into said gas producing chamber, means to admit the air with gasified fuel from said gas producing chamber into said combustion chamber, a second regenerative chamber adjacent to said combustion chamber, a second gas producing chamber adjacent to said combustion chamber and to said second regenerative chamber, a second set of fuel admitting pipes for said second gas producing chamber, means to exhaust the burned gases through said second regenerative chamber and through said second gas producing chamber, means to prevent the flow of fuel into said second gas producing chamber while it serves as a passage for said exhaust gases, and means to reverse the flow of air, gases and fuel through said chambers.

6. In a furnace, the combination with a combustion chamber, a regenerative chamber adjacent to said combustion chamber, a gas producing chamber adjacent to said regenerative chamber, a plurality of walls forming narrow passages through said regenerative chamber, means to admit air into said combustion chamber through said regenerative chamber, means to admit air from said regenerative chamber into said gas producing chamber, a plurality of pipes in the upper portion of said gas producing chamber, means to control the flow of the fuel through these pipes, means to prevent the flow of gases through these pipes, means to admit the gasified fuel from said gas producing chamber into said combustion chamber, a second regenerative chamber, a second gas producing chamber, a second set of fuel admitting pipes for said second gas producing chamber, means to exhaust the gases from said combustion chamber through said second regenerating and gas producing chambers, means to prevent the flow of the fuel through said second set of fuel pipes when said exhaust gases flow through said second chambers, and means to reverse the flow of air, gases and fuel through said chambers.

Signed at New York in the county of New York and State of New York, this 23d day of December A. D. 1924.

NICHOLAS I. IVANOVSKY.